United States Patent [19]

Watson et al.

[11] 4,276,564

[45] Jun. 30, 1981

[54] TELEVISION SYSTEMS

[75] Inventors: John B. Watson; Philip J. Dodds, both of Romsey, England

[73] Assignee: Independent Broadcasting Authority, London, England

[21] Appl. No.: 959,000

[22] Filed: Nov. 9, 1978

[30] Foreign Application Priority Data

Dec. 11, 1977 [GB] United Kingdom ............... 47169/77

[51] Int. Cl.³ ........................ H04N 7/62; H04N 9/62
[52] U.S. Cl. .................................... 358/139; 358/10; 455/9
[58] Field of Search .................... 358/139, 10; 325/31; 455/9, 118

[56] References Cited

U.S. PATENT DOCUMENTS

| | | | |
|---|---|---|---|
| 3,760,275 | 9/1973 | Ohsawa et al. | 358/139 |
| 3,792,195 | 2/1974 | Wilson et al. | 358/139 |
| 3,978,282 | 8/1976 | Fulton | 358/139 |
| 3,997,842 | 12/1976 | Pexa | 358/139 |
| 4,007,423 | 2/1977 | Dickinson | 358/139 |
| 4,207,431 | 6/1980 | McVoy | 358/139 |

OTHER PUBLICATIONS

Dr. Ing. P. D'Amato et al., Intermodulation Distortion Measurement in TV Transposers with a Test Signal Inserted in the Video Blanking Interval, May 13, 1970 Proceedings of the Joint Conference on T.V.
Dr. Ing. P. D'Amato and Dr. Ing. G. Barbieri, "Signal-to-Noise Ratio Automatic Measurement in the Blanking Interval of a Video Signal" May 13, 1970 Proceeding of the Joint Conference on T.V.

Primary Examiner—Howard W. Britton
Assistant Examiner—Edward L. Coles
Attorney, Agent, or Firm—Laubscher & Laubscher

[57] ABSTRACT

Apparatus for deriving a parameter indicative of the quality of parts of, or the whole of, a television system from an insertion test signal repeated at regular intervals during field blanking periods of a transmitted signal includes a sampling means for providing a digital signal representing the amplitude at a sampling position of the test signal, means for actuating the sampling means, and a computer. The computer is programmed to caculate the quality parameter from a number of the amplitude representative digital signals taken at different sampling positions by the sampling means, to provide the calculated parameter as an output, and to respond to timing origins included in the television signal to thereby control the actuating means. The actuating times are so related to the timing origins that the digital amplitude signals are provided at an average rate which is low compared with the rate at which the signals occur during a single test signal. A digital store is connected between the sampling means and the computer for storing a number of the digital amplitude signals and also for storing request signals for the amplitude signals in such a way that the sampling means is enabled to operate during a line period at a greater rate than the computer.

The digital store may be in the form of a first-in-first-out store.

4 Claims, 9 Drawing Figures

TELEVISION SYSTEMS

BRIEF DESCRIPTION OF THE PRIOR ART

The present invention relates to digital apparatus for monitoring television signals.

In order that the quality of a television signal may be monitored it has become customary to add one or more insertion test signals to the television signal. Such a test signal occupies one of the line periods which occurs during the field blanking periods of the signal and is not therefore displayed on ordinary receivers. It is repeated at regular intervals, usually on every occurrence of the chosen line period. With a 625 line interlaced system of 25 fields of odd lines per second alternating with 25 fields of even lines per second, the test signal is repeated 25 times per second, and the line period available for the signal is 64 microseconds. Two or more insertion test signals may be added to the same television signal, each on its own line period.

The form of the test signal is such that analysis thereof can yield quality parameters useful in determining the behaviour of, and over a period of time changes in the behaviour of a television system as a whole, or of parts of a system, for example, communication links or transmitters, including unmanned transmitters. The quality parameters are calculated from measurements of the test signal. They may show behaviour directly or they may require to be used in further calculation to show behaviour. The term "quality parameter" as used herein is to be interpreted accordingly.

To make best use of the signal, accurate analysis is required. For this purpose it has been proposed to use automatic apparatus which avoids the requirement for a skilled technician to make repeated measurements.

A basic form of such apparatus is disclosed in the Schaffer et al U.S. application Ser. No. 626,453 filed Oct. 28, 1975, assigned to the same assignee as the instant application, which discloses apparatus designed to take one sample per test signal. This has proved in practice to be inadequate in certain circumstances especially if a very large number of samples has to be taken in order to evaluate the quality of the television signals due to the total time taken for the evaluation and to the time differences between samples which represent the quality parameter. This latter factor adversely affecting the accuracy of the apparatus.

SUMMARY OF THE INVENTION

It is an object of the present invention to allow a plurality of samples to be taken during each test signal. The plurality of samples may relate to any of the quality parameters, of which there may be twelve.

The present invention provides apparatus for deriving a television quality parameter from an insertion test signal which is repeated at regular intervals during field blanking periods of a television signal, comprising a sampling means operable, when actuated, to provide a digital amplitude signal representing the instantaneous amplitude at a sampling position of the test signal, controllable actuating means for actuating the sampling means, and a computer programmed- (a) to calculate the quality parameter from a plurality of digital amplitude signals, corresponding with instantaneous amplitudes at different sampling positions on the test line, and provided by the sampling means.

(b) to provide the calculated quality parameter as output, and (c) to respond to timing origins carried by the television signal and control the actuating means at times, so related to the timing origins that the signals of said plurality of signals are provided in turn, at an average rate, which is low compared with the rate at which the signals occur during a single test signal, the improvement comprising a digital store connected between the sampling means and the computer for storing a plurality of the digital amplitude signals and for storing request signals for said amplitude signals, the arrangement being such that the sampling means is enabled to operate during a line period at a greater rate than the computer.

The storage capacity is conveniently provided in the form of a first-in-first-out (F.I.F.O) store.

It is found that an inexpensive analog to digital converter of the kind to be regarded as slow in the digital art, is capable of providing more than one digital amplitude signal during each occurrence of a test signal. Because the computer is required to operate (both by processing the data and providing request signals) at a rate which is slow compared with that of the A to D converter, a computer of economic construction may still be employed.

BRIEF DESCRIPTION OF THE DRAWING

In order that the present invention be more readily understood an embodiment thereof will now be described by way of example with reference to the accompanying drawings, in which.

DETAILED DESCRIPTION

Figure 1:
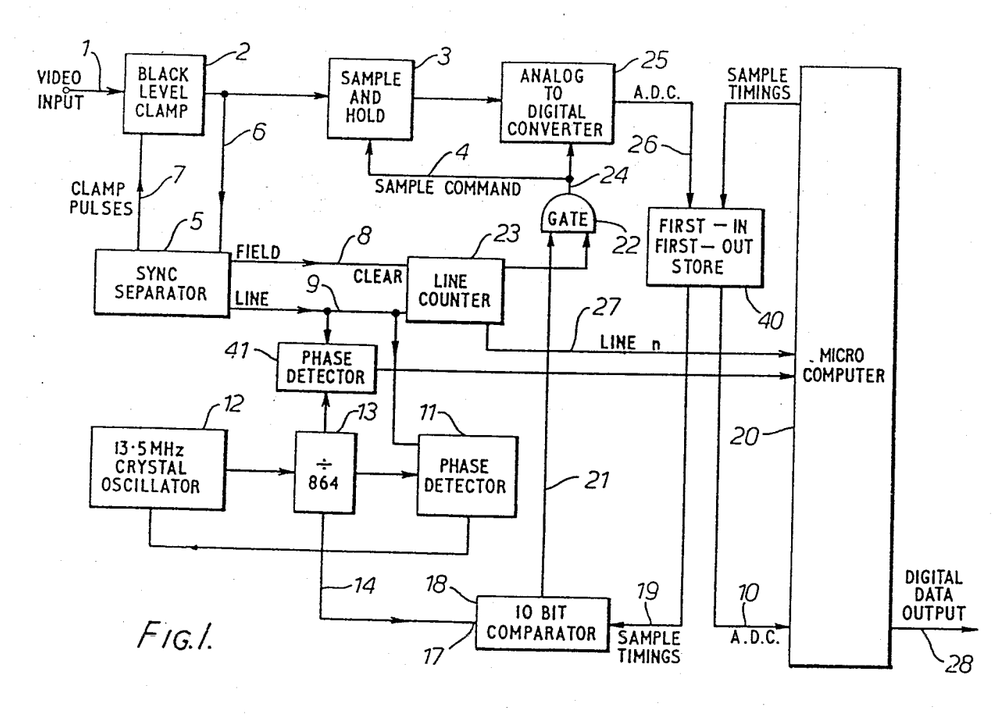
FIG. 1 shows a block diagram of apparatus according to the invention.

The apparatus of FIG. 1 has an input 1 for 625 line interlaced television signals of 25 frames (50 fields) per second received by cable or off the air via a demodulator. The signal is clamped by a black level clamp 2 and applied to a sample and hold circuit 3. Circuit 3, when actuated briefly by a sample command signal on line 4 provides an analog signal corresponding with the instantaneous amplitude, above black level, of the received signal. This analog signal is in the form of a voltage on a capacitor A sync separator 5 fed from the clamped signal on line 6 provides clamp pulses on line 7, field pulses on line 8, and line pulses on line 9. The line pulses on line 9 are fed to a phase detector 11 in a phase locked loop wherein the received line frequency controls a 13.5 MHz crystal oscillator 12. A divide-by-864 device 13 in the loop divides the 13.5 MHz frequency to line frequency (i.e. 625×25=15625 Hz=13.5 MHz/864).

The divide-by-864 device 13 also operates to count the cycles of the oscillator 12 and provide a numerical output count of 10 bits on highway 14. The output count on highway 14, whose values represent a series of 864 positions along the active line time of the received signals, is applied to one input 17 of a 10 bit comparator 18. A second 10 bit input 19 to comparator 18 on highway 10 receives a timing count from a micro computer 20 via a digital buffer store in the form of a first-in-first-out (F.I.F.O.) store 40.

When the two counts received by comparator 18 coincide, a signal is provided on line 21 and applied to a gate 22, responsive also to a line counter 23. Line counter 23 counts line pulses on line 9 and is cleared by field pulses on line 8. The output 24 of gate 22 provides the sample command on line 4 to actuate the sample and hold 3 and also an analog to digital converter 25 which provides a ten bit digital output representing the instantaneous magnitude of the signal, when sampled, which is passed to the computer 20 on 10-bit highway 26 via the F.I.F.O. store 40.

Counter 23 also passes a signal to the computer 20 on line 27 when a television line of interest, shown as line n, is present.

Thus amplitude signals, and a signal indicating when line n of the signal is present are passed to the computer, and the computer provides a timing count to 19 as well as an output of digital data at 28.

A further phase detector 41 is provided and is connected to the outputs of sync separator 5 and the dividing circuit 13. The output from the detector 41 is used to control the computer 20 in such a manner that if there is a disparity between the sync pulses generated and as received, the computer will restart its cycle of operation. Thus, the phase detector 41 is a relatively fast acting detector for removing erroneous test samples from a calculation of quality parameters, whereas the phase detector 11 is a relatively slow acting detector which includes a phase locked loop to gradually bring the sync pulses back into phase, all calculations during this period being inhibited by the detector 41.

Figure 3:
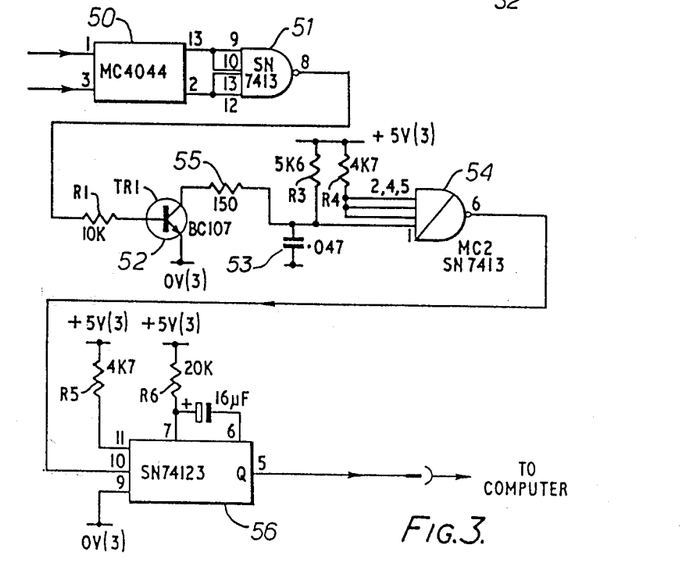
FIG. 3 shows a circuit diagram of a part of the circuit shown in FIG. 1.

FIG. 3 shows a more detailed circuit diagram of the detector 41. A phase detection circuit 50 receives one input from the sync separator 5 and one input from the divider circuit 13. A difference in phase between the inputs to the circuit 50 causes one of its outputs to go "low" for the duration of the difference in time period. The resulting differential inputs to a Schmitt NAND gate 51 causes its output to go "high" to turn a transistor 52 on. This causes a capacitor 53 to discharge resulting in a rising egde the output of a further Schmitt circuit 54 provided that the "loss of sync" condition duration exceeds the transient protection time afforded by the time constant of capacitor 53 and resistor 55. The resulting rising edge at an input of monostable 56 causes a positive pulse at its output. This pulse is routed to an input of the computer 20 and its duration is fixed by external timing components on the monostable 56 such that it will be intercepted by the computer 20 during the next interrupt, the interrupt function of the computer being explained in more detail later.

Figure 2:
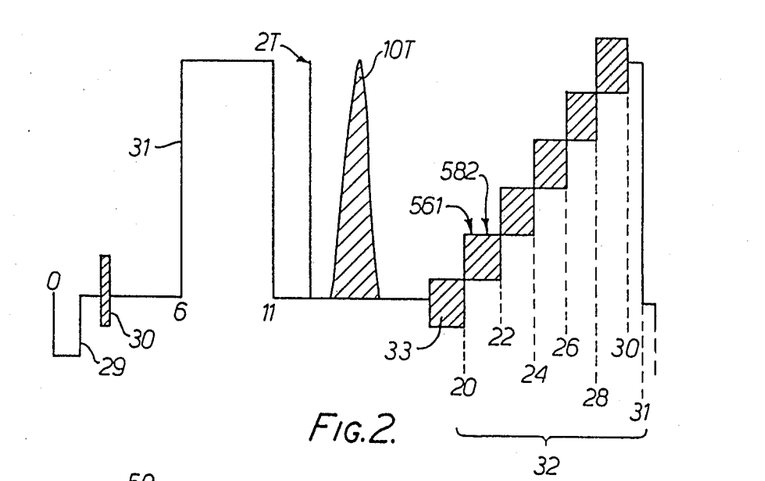
FIG. 2 shows an example of an insertion test line.

A test signal is as shown in FIG. 2 and is provided on line 19 of alternate, eg. even fields of a television signal. Following the line sync pulse 29 is a burst of colour sub-carrier 30, a white bar 31, a 2T pulse, a 10T pulse, and a staircase 32. Each step of the staircase has a duration of 4 microseconds and has a superimposed colour burst. When the colour burst at black level immediately before the staircase is included (30 in FIG. 2 and hereinafter called step 0) there are timing values at points 6, 11 and 20 to 31 shown in FIG. 2 in units of 2 microseconds, and the duration of the signal, from the leading edges of the sync pulse is 64 microseconds.

Samples are taken at a number of points on the test signal, the number and position of the samples depending on the parameters to be measured. The apparatus shown in FIG. 1 is intended to measure up to twelve different parameters of a colour television signal but the following description will be limited to discussion of only some of these twelve parameters.

For luminance non-linearity samples are taken nominally during the middle third of each step including step 0. Thus on the 20 to 22 step samples are then taken at count 561 of the divide-by-864 and then at intervals of three counts up to and including count 582. Counts 561 and 582 are indicated in FIG. 2. There are eight sampling positions and a number of samples are taken at each. For the PAL system the number of samples is a multiple of four e.g. 32 Because there is a finite delay before the sample and hold circuit 3 provides an output, the sampling is not precisely upon the middle third of each step. This point is not of practical importance.

The computer employed is a commercially available micro computer (Intel 4040 manufactured by Intel Corporation, Calif., U.S.A.) comprising a single chip 4 bit central processing unit, eight read only memories (ROM's), four random access memories (RAM's) and about 30 TTL packages used for control purposes. The ROM's have a total capacity of 2048 program steps and the total RAM capacity is 1280 bits. The complete computer is mounted upon a single card of about 9×5 inches in size. Access is by 16 data input lines and 32 output lines.

On each occurrence of a test line for a PAL television system, several samples are taken on step 0 from the same occurrence of the test line as samples from any of the other steps 1 to 5. That is to say, whenever sampling occurs on any one of steps 1 to 5 then, during the same occurrence of the test line, a sample is also taken from step 0. Many such successive occurrences of the test line may be necessary before enough samples from the step have been obtained. Any subsequent sampling of another of the steps 1 to 5 is also accompanied in this way by sampling of step 0.

Samples are taken from steps 0 and 1 and the software controlling the sampling ensures, by means of counters and indicator flags, that the samples for each step are taken from these steps for a total of 256 successive occurrences of the test line, during each of which a sample is taken from each of steps 0 and 1.

Every time the sample count is divisible by four (i.e. when four samples have been taken at a sampling point), a timing counter in the computer is incremented by three. For every group of samples, the computer makes a check for the presence of line n e.g. line 3 of the television signal (which necessarily occurs on the odd fields containing line 19), and a sample timing count is provided for presentation to the 10 bit input 19 of comparator 18 (FIG. 1). This timing count is the start time entered by the program memory incremented by the timing counter. The timing count reaches the comparator 18 well before the occurrence of the television signal. When line 19 arrives, the presence of equal count numbers at inputs 17 and 19 of comparator 18 and a line 19 count at gate 22 provides a sample command on line 4 to actuate the sample and hold circuit 3. The clamped video input is sampled, digitalized in converter 25, received by the computer and added to one of three random access memory stores. A delay phase of a sub-routine of the computer 20 is provided to allow converter 25 to operate.

Samples taken and stored as just described are processed by an arithmetic part of the computer.

The instantaneous amplitude v of the test line at time t is given by the equation- $$v = v_L + v_c \sin(2\pi ft + \phi) \quad -(1)$$

where
f is the colour sub-carrier frequency,
$v_L$ is the luminance amplitude,
$v_c$ is the sub-carrier amplitude, and
$\phi$ is an arbitrary phase angle.

With the PAL system, the phase of the subcarrier on line 3, or any other line of the television signal, changes from frame to frame in multiples of 90°, e.g. 0°, 270°, 180°, 90°, 0° repeating. From equation (1) it follows tht the amplitudes on four consecutive samples $v_n$—$v_{n+3}$, taken all on odd or all on even, fields are $$v_n = v_L + v_c \sin B \quad -(2)$$

$$v_{n+1} = v_L - v_c \cos B \quad -(3)$$

$$v_{n+2} = v_L - v_c \sin B, \text{ and} \quad -(4)$$

$$v_{n+3} = v_L + v_c \cos B \quad -(5)$$

where $B = 2\pi ft + \phi$
from which- $$v_I = v_n - v_{n+2} = 2 v_c \sin B \quad -(6)$$

$$v_Q = v_{n+3} - v_{n+1} = 2 v_c \cos B, \text{ and} \quad -(7)$$

$$v_r = v_n + v_{n+1} + v_{n+2} + v_{n+3} = 4 v_2 \quad -(8)$$

These values are derived by the arithmetic part of the computer.

More details of the computer and its programming are given in the aforementioned U.S. application Ser. No. 626,453 to which attention is directed and which is incorporated herein by reference.

Figure 5:
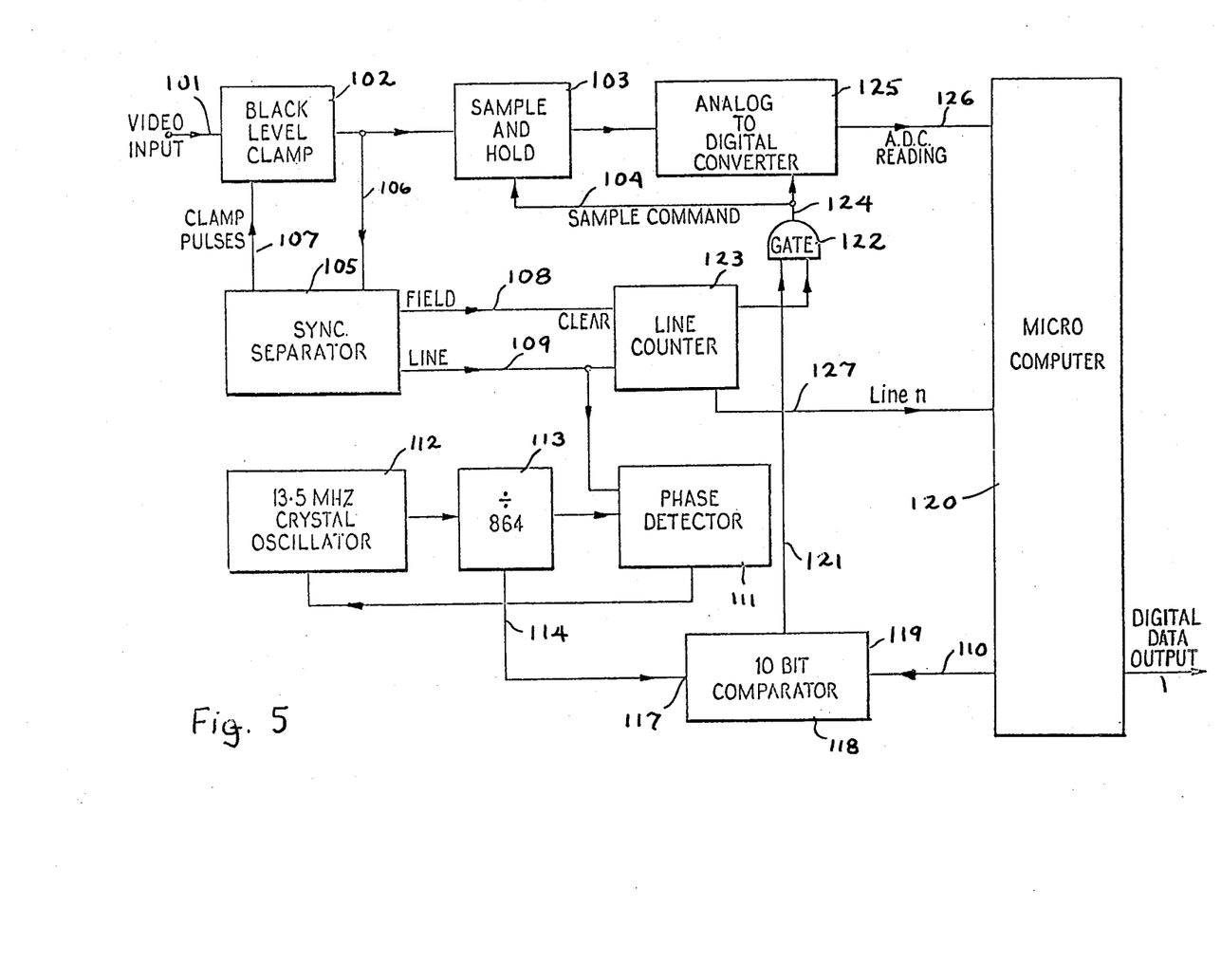
FIG. 5 is a block diagram illustrating the apparatus of the companion Schaffer et al U.S. application Ser. No. 626,453 filed Oct. 28, 1975.

Referring now more particularly to FIGS. 5–9, the apparatus of FIG. 5 includes an input 101 for 625 line interlaced television signals of 25 frames (50 fields) per second received by cable or off the air via a demodulator. The signal is clamped by a black level clamp 102 and applied to a sample and hold circuit 103. Circuit 103, when actuated briefly by a sample command signal on line 104 provides an analog signal corresponding with the instantaneous amplitude, above black level, of the received signal. This analog signal is in the form of a voltage on a capacitor.

A sync separator 105 fed from the clamped signal on line 106 provides clamp pulses on line 107, field pulses on line 108, and line pulses on line 109. The line pulses on line 109 are fed to a phase detector 111 in a phase locked loop wherein the received line frequency controls a 13.5 MHz crystal oscillator 112. A divide-by-864 device 113 in the loop divides the 13.5 MHz frequency to line frequency (i.e. 625×25=15625 Hz=13.5 MHz/864).

The divide-by-864 device 113 also operates to count the cycles of the oscillator 112 and provide a numerical output count of 10 bits on highway 114. The output count on highway 114, whose values represent a series of 864 positions along the active line time of the received signals, is applied to one input 117 of a 10 bit comparator 118. A second 10 bit input 119 to comparator 118 on highway 110 receives a timing count from a micro computer 120.

When the two counts received by comparator 118 coincide a signal is provided on line 121 and applied to a gate 122, responsive also to a line counter 123. Line counter 123 counts line pulses on line 109 and is cleared by field pulses on line 108. The output 124 of gate 122 provides the sample command on line 104 to actuate the sample and hold 103 and also an analog to digital converter 125 which provides an eight bit digital output representing the instantaneous magnitude of the signal, when sampled, which is passed to the computer 120 on 8 bit highway 126.

Counter 123 also passes a signal to the computer 120 on line 127 when a television line of interest, shown as line n, is present.

Thus digitized amplitude signals, and a signal indicating when line n of the signal is present are passed to the computer, and the computer provides a timing count at 119 as well as an output of digital data at 128.

The choice of computer and the programming thereof depend upon the parameter or parameters to be determined, and of course upon the form of test line involved. The following Examples are given by way of illustration.

EXAMPLE 1

Figure 6:
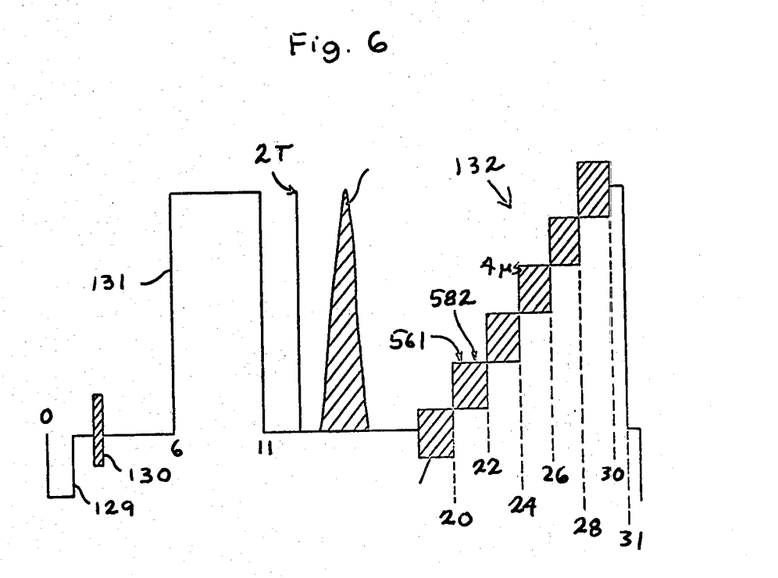
FIG. 6 is a waveform diagram illustrating the insertion test line for the apparatus of FIG. 5.

In this Example, the test line is as shown in FIG. 6 and is provided on line 119 of the signal. Following the line sync pulse 129 is a burst of colour sub-carrier 130, a white bar 131 a 2T pulse a 10T pulse and a staircase 132. Each step of the staircase has a duration of 4 microseconds and has a superimposed colour burst. When the colour burst at black level immediately before the staircase is included (133 in FIG. 6) there are timing values 6, 8, 11—31 shown in FIG. 5 in units of 2 microseconds, and the duration of the signal, from the leading edge of the sync pulse is 64 microseconds.

Samples are taken nominally during the middle third of each step. Thus on the 120 to 122 step samples are taken at count 561 of the divide-by-864 and then at intervals of three counts up to and including count 582. Counts 561 and 582 are indicated in FIG. 6. There are eight sampling positions and four samples are taken at each, at four successive occurrences of the test line. Because there is a finite delay before the sample and hold circuit 103 provides an output, the sampling is not precisely upon the middle third of each step. This point is not of practical importance.

The computer employed is a commercially available micro computer (Intel MCS-4 manufactured by Intel Corporation, California, U.S.A.) comprising a single chip 4 bit central processing unit, four read only memories (ROM's), four random access memories (RAM's) and about 30 TTL packages used for control purposes. The ROM's have a total capacity of 1024 program steps and the total RAM capacity is 1280 bits. The complete computer is mounted upon a single card of about 9×5 inches in size. Access is by 16 data input lines and 32 output lines.

Figure 7:
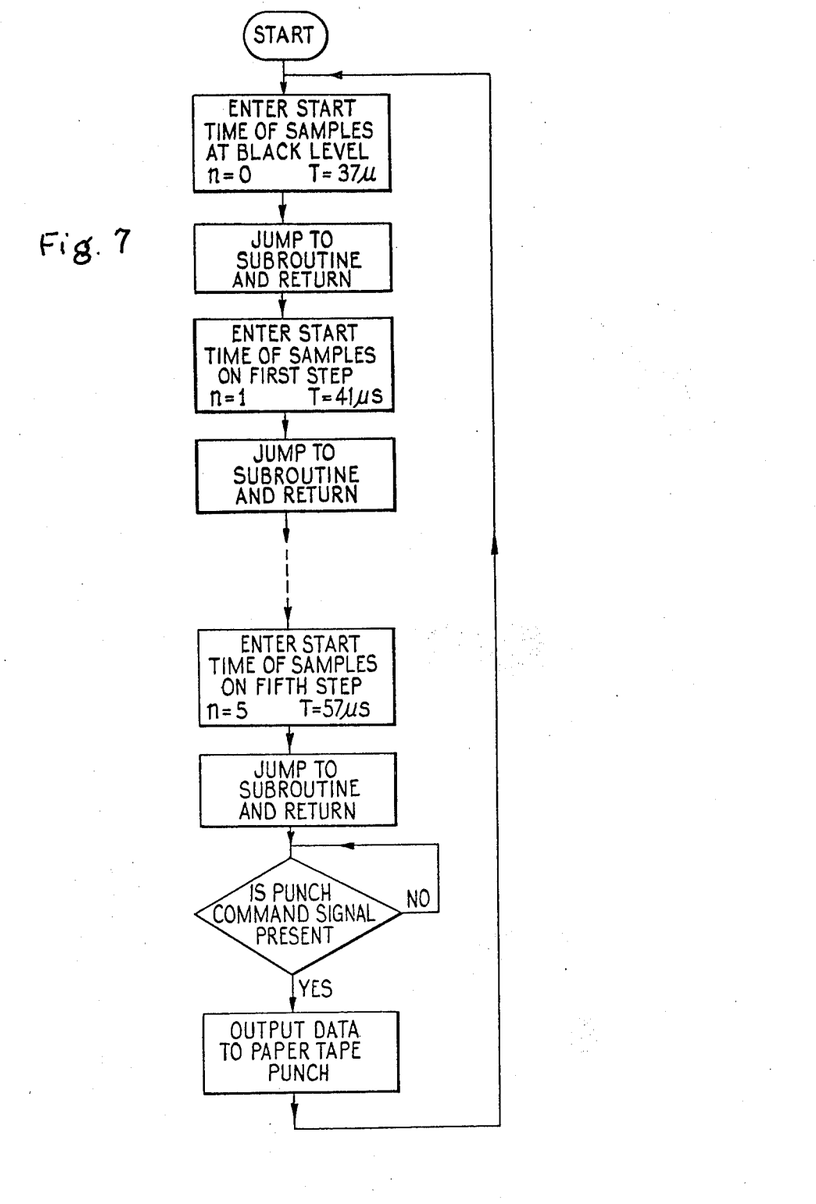
FIG. 7 illustrates the main program of the microcomputer of the system of FIG. 5.
Figure 8:
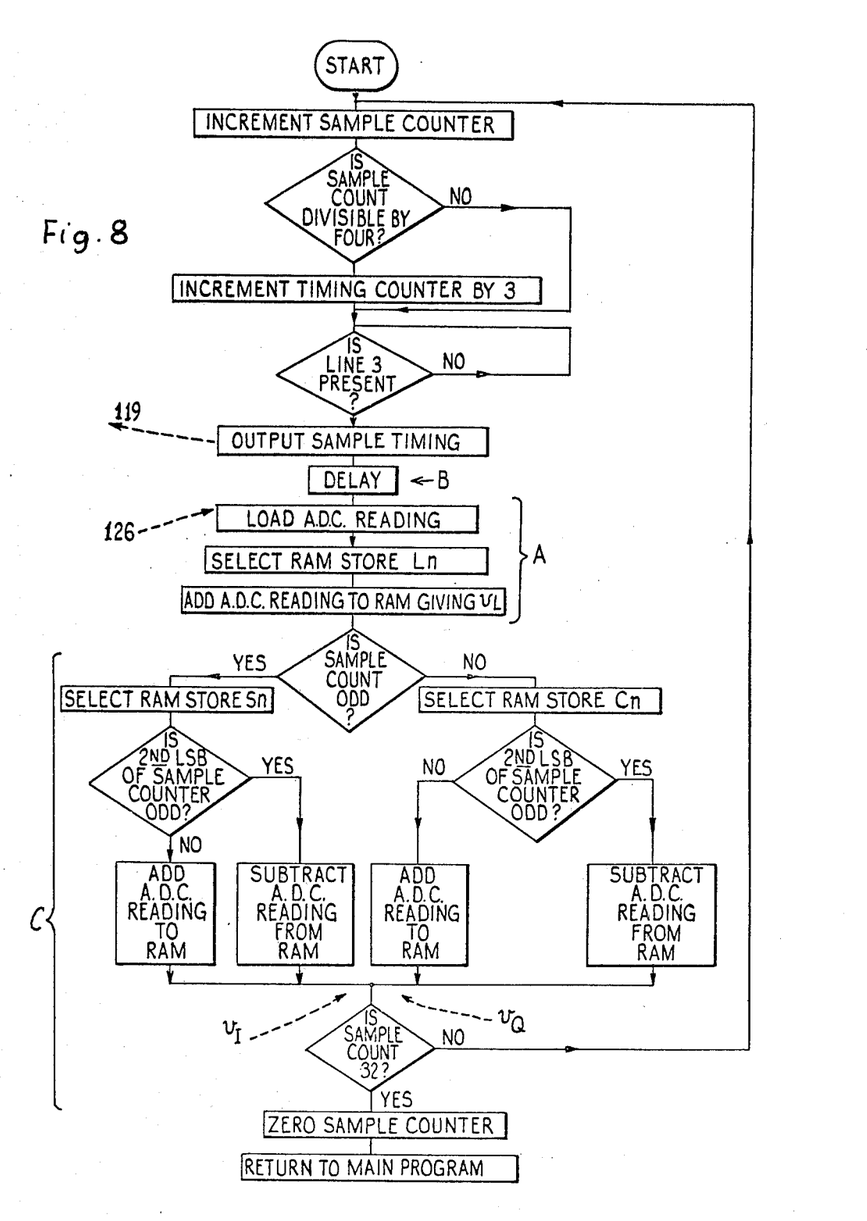
FIG. 8 illustrates a sub-routine used by the main program of FIG. 7.

The functioning of the computer is best explained by reference to FIGS. 7 and 8. FIG. 7 shows the main program of the computer and FIG. 8 shows a sub-routine thereof. By sampling instantaneous amplitude values of the signal at the black level immediately before the staircase and then on the remaining five steps, data is obtained from which useful parameters, including linearity, can be derived. In accordance with the invention, a single amplitude value is taken for each occurrence of line 103.

By the main program, the start times of the sampling at the black level and on the five further steps of the staircase are entered into the sub-routine of FIG. 7 from the program memory of the computer in turn. When a start time is entered the sub-routine of FIG. 7 is followed to effect sampling on the staircase level immediately following. Four samples are taken at each of the eight sampling points on each step. After the sampling of the staircase has been completed, and data calculated therefrom, the results are output in digital form for recording permanently by a paper tape punch of conventional design.

When a start signal actuates the sub-routine, a sample counter is incremented by one value at a time. Every time the sample count is divisible by four (i.e. when four samples have been taken at a sampling point), a timing counter is incremented by three. For every sample, a check is made for the presence of line 103 of the television signal (which necessarily occurs on the odd fields containing line 119), and a sample timing count is provided for presentation to the input 119 of comparator 118 (FIG. 5). This timing count is the start time entered by the program memory incremented by the timing counter. The timing count reaches the comparator 118 well before the occurrence of line 119. When line 119 arrives, the presence of equal count numbers at inputs 117 and 119 of comparator 118 and a line 119 count at gate 122 provides a sample command on line 104 to actuate the sample and hold 103. The clamped video input is sampled, digitised in converter 125, received by the computer and added to one of three random access memory stores—see A in FIG. 8. A delay phase of the sub-routine (see B in FIG. 8) is provided to allow converter 125 to operate.

Since the timing counter is incremented in steps of three for application to the input 119 of comparator 118, the effect is to advance the timing of the sampling by circuit 103 by three cycles of the 13.5 MHz oscillator (when the sample count is a multiple of four). The frequency of the oscillator is slightly greater than the third harmonic of the 4.43 MHz colour sub-carrier. Consequently the sampling positions are separated by intervals slightly less than intervals corresponding with cycles of the subcarrier.

Samples taken and stored as just described are processed by an arithmetic part C of the sub routine. The sample counter is incremented until the sample count is 32 and then returned to zero.

The instantaneous amplitude v of the test line at time t is given by the equation- $$v = v_L + v_c \sin(2\pi f t + \phi) \quad (1)$$

where f is the colour sub-carrier frequency,
$v_L$ is the luminance amplitude,
$v_c$ is the sub-carrier amplitude, and
$\phi$ is an arbitrary phase angle.

With the PAL system, the phase of the sub-carrier on line 103, or any other line of the television signal, changes from frame to frame in multiples of 90°, e.g. 0°, 270°, 180°, 90°, 0° repeating. From equation (1) it follows that the amplitudes on four consecutive samples $v_n$—$v_{n+3}$, taken all on odd or all on even, fields are- $$v_n = v_L + v_c \sin B \quad (2)$$

$$v_{n+1} = v_L - v_c \cos B \quad (3)$$

$$v_{n+2} = v_L + v_c \sin B, \text{ and} \quad (4)$$

$$v_{n+3} = v_L + v_c \cos B \quad (5)$$

where $B = 2\pi f t + \phi$
from which- $$v_I = v_n - v_{n+2} = 2 v_c \sin B \quad (6)$$
$$v_Q = v_{n+3} - v_{n+1} = 2 v_c \cos B, \text{ and-} \quad (7)$$
$$v_r = v_n + v_{n+1} + v_{n+2} + v_{n+3} = 4v_2 \quad (8)$$

These values are derived by the arithmetic part C

In the arithmetic part C, the digitised amplitudes $v_c$ taken on odd smaple counts, e.g. on fields n and n+2, and the even sample counts, e.g. on fields n+1 and n+3 are routed separately. The odd-counts cause the value $v_c \sin B$ to be selected from a random access memory. When the second least significant bit (LSB) of the (binary) sample counter is odd-this occurs for alternate ones of the odd sample counts-the digitised amplitude value from the converter 125 is subtracted from the value $v_c \sin B$. When the second LSB is even, the digitised value is added. The even counts cause a similar operation. Here, the digitised value is added to $v_c \cos B$ when the second LSB is even and subtracted therefrom when the second LSB is odd.

The result is to produce one luminance component value $v_L$, and two colour component values, $v_I$ and $v_Q$ derived as in equations (6), (7) and (8) above for the paper tape punch. These three values are readily communicated using a transmitter actuated by the tape over a circuit of small bandwidth, e.g. a normal telephone circuit. By having the apparatus which is reasonably simple and cheap, involving as it does an economic analog to digital converter 125 and a micro computer 120 of small size and low rate of operations, it is feasible to install the apparatus at remote sites and pass the results to a central station for further processing to provide performance data for action by expert staff watching the performance of equipment at several sites.

With some further complexity, the punched paper tape can be processed at the site, or the data shown herein as going to the paper tape punch can be fed instead direct to further computer equipment at the site. In this way it is possible to provide fully processed quality information in visual form for the assistance of a technician making on-site adjustments to the equipment. A more elaborate computer, giving results which require no further processing, may be provided within the apparatus itself in place of the micro-computer 120.

EXAMPLE 2

Figure 9:
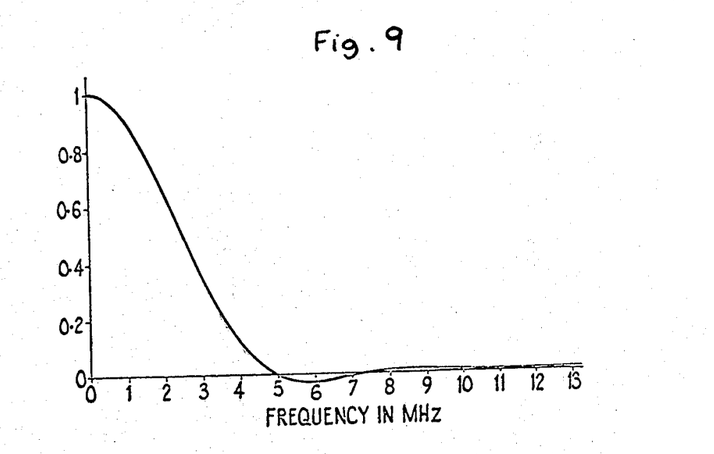
FIG. 9 illustrates the spectrum of the 2T pulse provided in the test line of FIG. 6.

FIG. 9 shows the spectrum of the 2T pulse of FIG. 6. Only very little energy is present beyond 5 MHz. Having regard to the general rule that a signal can be reconstituted without loss for samples taken at a rate of twice the bandwidth, the 2T pulse requires a sampling interval of not more than 100 nanoseconds. By the application of the present invention, the sampling is effected on successive occurrences of the test line. Thus with a test line occurring only on odd fields of a 50 field/sec. system the required sampling period becomes not more than $0.04 + 10^{-7}$ second which is well within the scope of economic apparatus.

EXAMPLE 3

For the measurements of the white bar 131 of FIG. 6 to determine amplitude and tilt, three instantaneous amplitudes are taken viz. one at the black level after the burst 30 of colour sub-carrier and two spaced apart at the nominally white level of the bar. Using the present method the amplitudes are taken at intervals of more then 0.04 seconds.

It is to be noted that an analog to digital converter given an 8 bit output (256 possible values) is adequate for present purposes. The possible error in the digitised value is ±0.5 value. With the staircase shown in FIG. 6, each riser corresponds with about 44 values of the converter output. An error of 0.5 value is of significance but not of primary importance. It is in any case reduced by averaging over four, or a multiple of four fields, as in Example 1.

Referring again to the invention of FIGS. 1-4, in this example, 256 samples are taken from each step, then 64 sets of four samples produce values of $64V_I$, $64V_Q$ and $64V_r$ called, say, $V_S$, $V_C$ and $V_L$ respectively. These quantities $V_S$, $V_C$ and $V_L$ are calculated during the collection of samples for steps 0 and 1.

When sampling for these steps is complete the values of $V_S$, $V_C$ and $V_L$ for steps 0 and 1 are made available to another part of the program for further analysis. Meanwhile, further sampling of the staircase is commenced. Samples are now taken from step 2 and step 3 and, as before, step 0, the software again ensuring that samples are taken from these three steps during each of 256 successive occurrences of the test line. At the end of this time a new set of $V_S$, $V_C$ and $V_L$ is made available for each of the three steps for further analysis and sampling progresses to steps 4 and 5, again accompanied by step 0. Once again sampling proceeds on these steps during each of 256 consecutive occurrences of the test line and a final set of $V_S$, $V_C$ and $V_L$ for these steps is produced.

The net result is that samples are taken from each of steps 1 to 5 during exactly the same occurrences of the test line as samples from step 0. The analysis that takes place following sampling for each step is the calculation of the chrominance phase and amplitude from $$\phi = \tan^{-1}(V_S/V_C)$$

for the sub-carrier phase and $V_A{}^2 = V_C{}^2 + V_S{}^2$ for the sub-carrier amplitude.

These quantities are calculated for each of steps 1 to 5 and three times for step 0 (which is sampled in all three separate times). For each step the difference between the $V_L$, $\phi$ and $V_A$ for the sampling of step 0 with which it coincided is taken. Thus each step is referenced to a sampling of step 0 which occurred during the same successive occurrences of the test line. More processing then occurs to produce some final parameter values.

Digital storage in the form of store 40 is provided as a means of enabling the microcomputer to store sample request signals. Means is also provided of enabling the request signals to be extracted from the digital storage and applied to the comparator, which forms part of the sample timing system, for the purpose of identifying the point during the test signal at which the amplitude is required.

The store 40 also provides means by which the required digital amplitude signal obtained in response to a digital request signal is stored by the sampling system and a means by which the signal so stored can be extracted by the micro-computer.

The means by which the micro-computer stores the request signal and extracts the amplitude signal are such that they can be initiated by the microcomputer at an instant decided by the operation of its program.

The means of enabling the digital storage to be used in the manner described is effected by standard techniques in digital electronics but its effect and purpose is to provide a buffer for the transfer of digital signals between the micro-computer and the sample timing systems and between the sampling system and the micro-computer. The digital store 40 with capacity for several digital signals, thus isolates the sample timing and sampling systems from the relatively lower speed micro-computer except at the specific instant during the television frame when the transfer of signals is necessary.

The line n signal generated by the television line counter 23 is used to provide the micro-computer with a regular signal at a specific time during each television frame. The signal is used to initiate the interrupt facility of the micro-computer, this facility being a standard feature of modern computers (and micro-computers) which will not be further described here beyond stating that its general purpose is to enable parts of the computer software to be with an event, external to the computer, which gave rise to the interrupt signal while allowing other parts of the software to remain asynchronous. In the present apparatus the interrupt signal is used to synchronize part of the micro-computer program, called the data collection process, with a specific point in the television frame to enable the data collection process to initiate the action required to extract from the digital storage the samples (that is, the digital amplitude signals) provided by the sampling system in response to a previous set of request signals and to store in the digital storage those request signals appropriate to the required sampling instant during the next occurrence of the test signal.

Thus, at each occurrence of the interrupt signal (that is, at a specific point during each occurrence of the television frame) there is an interaction between the data collection process (that is, a part of the software) and the digital storage, the effect of this interaction being to request sampling at certain instants and to extract amplitude signals requested at the previous such interaction.

Between successive occurrences of the interrupt signal another part of the computer is engaged in processing digital amplitude signals that have been obtained some time previously. This is essentially asynchronous with the television signal.

It is a feature of the present apparatus that amplitude signals are derived in the manner described from several different occurrences of the test signal thereby avoiding the necessity of employing an analogue-to-digital converter capable of operating at a high frequency. Such an analogue-to-digital converter as used in the present equipment, while being inexpensive and slow relative to those which are customarily used in video processing, is still able to operate at such a speed as to provide several digits amplitude signals from each occurrence of the test signal. Thus there is still a necessity to sample from several occurrences of the test signal before sufficient data is available for an evaluation of a quality parameter to be performed. The several samples which are obtained from each occurrence of the test signal pertain in general to different quality parameters and before any can be evaluated the sampling needs to be repeated for several such occurrences. However, as indicated above, when sampling the staircase it is necessary to take a plurality of samples from the staircase at each occurrence of the test signal.

The advantage of this method is that the effects of slight variations in phase and amplitude which may affect the entire signal during the long sampling times can be substantially corrected. This is because such variations can be assumed to affect step 0 as well as any other steps and are hence cancelled out by the differencing process referring to previously. In the previously used method of sampling, where only one step was sampled at a time, these variations, even though they affected the complete signal were only noticed on the step currently being sampled. The effect was an unreasonable distortion of the relevant quality parameters in situations where considerable disturbances of the PAL 8-phase sequence are encountered. Such situations can occur, for example, when the source of the television pictures is a video tape recorder.

Figure 4:
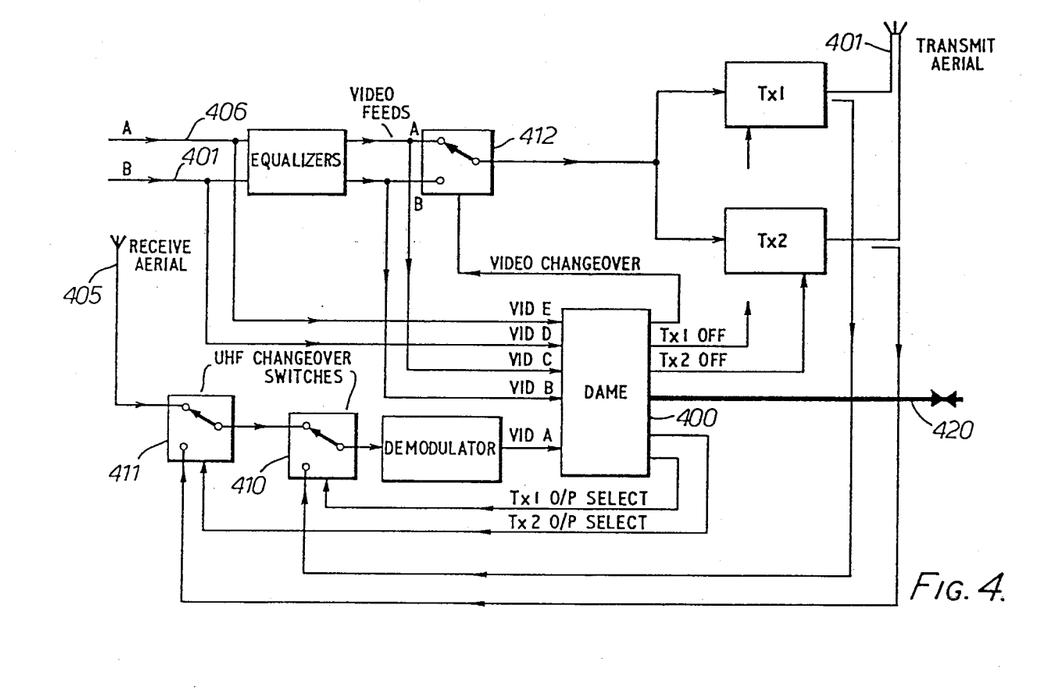
FIG. 4 shows an example of one use to which the apparatus of FIG. 1 can be put.

FIG. 4 shows one typical installation of apparatus as shown in FIG. 1. The apparatus of FIG. 1 is indicated by block 400. The installation is a transmitter/receiver site provided with a main transmitter aerial 401 capable of being driven by either of transmitters 402,403. A receiver aerial 405 is also provided further television signals are received by land lines 406,407.

The apparatus in block 400 is used to sequentially examine the television signals, if any, on receiving means 405,406 and 407 as well as the transmissions from the transmitters 402,403. Change over switches 410,411 allow this to be done.

The apparatus in block 400 can then operate in a number of ways. It can automatically switch off transmitter 402 if it detects that the signal from 402 is not up to standard and if it has also detected that the input to the transmitter is up to standard. Alternatively, it can signal a fault to a remote station or it can be accessed by a remote station from time to time in order that an operator at the remote station can monitor the performance of the installation. In either of the latter cases, use is made of a bidirectional telemetry highway 420.

If the apparatus in block 400 detects that one of the inputs from the land lines 406,407 is not up to standard a switch 412 is actuated to ensure that the faulty input is disconnected from the transmitters 402,403.

A teletype interface can be provided if desired, for recording the values of the various parameters at periodic intervals.

We claim:

1. In an apparatus for deriving a television quality parameter from an insertion test signal which is repeated at regular intervals during field blanking periods of a television signal, including sampling means operable, when actuated, to provide a digital amplitude signal representing the instantaneous amplitude at a sampling position of the test signal, controllable actuating means for actuating the sampling means, and computer means for calculating the quality parameter from a plurality of digital amplitude signals corresponding with instantaneous amplitudes at different sampling positions on the test line and provided by the sampling means, said computer means being responsive to timing origins carried by the television signal for controlling the actuating means at times so related to the timing origins that the signals of said plurality of signals are provided in turn, at an average rate which is low compared with the rate at which the signals occur during a single test signal;
the improvement which comprises
digital store means connected between the sampling means and the computer for storing a plurality of the digital amplitude signals and for storing request signals for said amplitude signals, the arrangement being such that the sampling means is enabled for operation during a line period at a greater rate than the computer.

2. Apparatus as defined in claim 1, wherein said store means comprises a first-in-first out store means.

3. Apparatus as defined in claim 2, wherein the samples are taken from steps of the test line.

4. In a method of deriving an output representing a television quality parameter from an insertion test signal which is repeated at regular intervals during field blanking periods of a television signal which includes the steps of deriving a plurality of digital amplitude signals each representing the instantaneous amplitude of the test line at a different sampling position thereon at times so related to timing origins carried by the television signal that the different signals of said plurality are derived at an average rate which is low compared with the rate at which the signals occur during a single test line, and feeding the digital amplitude signals to a computer programmed to calculate the quality parameter, to provide said parameter as output, and to respond to timing origins carried by the signal to provide requests related to said timing origins in a manner corresponding with the sampling positions on said occurrences of the test line, said plurality of digital amplitude signals being provided in response to said requests;
the improvement which comprises
storing digital amplitude signals; and storing request signals for said amplitude signals, whereby the sampling system is enabled to operate during a line period at a greater rate than the computer.

* * * * *